US010055553B2

(12) United States Patent
Fahrny (10) Patent No.: US 10,055,553 B2
(45) Date of Patent: *Aug. 21, 2018

(54) PC SECURE VIDEO PATH

(71) Applicant: Comcast Cable Communications, LLC, Philadelphia, PA (US)

(72) Inventor: James W. Fahrny, Parker, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/084,203

(22) Filed: Mar. 29, 2016

(65) Prior Publication Data

US 2016/0350517 A1 Dec. 1, 2016

Related U.S. Application Data

(63) Continuation of application No. 14/201,997, filed on Mar. 10, 2014, now Pat. No. 9,332,320, which is a continuation of application No. 13/769,618, filed on Feb. 18, 2013, now Pat. No. 8,713,685, which is a (Continued)

(51) Int. Cl.
*G06F 21/00* (2013.01)
*G06F 21/10* (2013.01)
*H04L 9/08* (2006.01)
*H04N 21/647* (2011.01)
*G06F 21/60* (2013.01)
*H04L 29/06* (2006.01)

(52) U.S. Cl.
CPC ............ *G06F 21/10* (2013.01); *G06F 21/606* (2013.01); *H04L 9/08* (2013.01); *H04L 9/0827* (2013.01); *H04L 63/0884* (2013.01); *H04N 21/64715* (2013.01); *G06F 2221/0797* (2013.01)

(58) Field of Classification Search
CPC ...................................................... G06F 21/10
See application file for complete search history.

(56) References Cited

U.S. PATENT DOCUMENTS 6,064,739 A 5/2000 Davis
7,734,933 B1 6/2010 Marek et al.
2003/0028664 A1 2/2003 Tan et al.
(Continued)

FOREIGN PATENT DOCUMENTS

EP 2063675 A1 5/2009

OTHER PUBLICATIONS

Canadian Office Action—CA Appl. 2,732,709—dated Jan. 23, 2017.
(Continued)

*Primary Examiner* — Morshed Mehedi
(74) *Attorney, Agent, or Firm* — Banner & Witcoff, Ltd.

(57) ABSTRACT

A system and method are disclosed for creating a secure video content path, or a protected media content bus, within an unsecure personal computer. A portable security module, or electronic key safe, may be inserted into a personal computer that has different internal components for processing secure and unsecured content. The security module may establish a secure encrypted link with a secure video processor of the personal computer, and may use the personal computer's network interface to request authority to receive secured content. The security module may provide content keys to the secure video processor to access secured content received over an external network.

20 Claims, 4 Drawing Sheets

Related U.S. Application Data continuation of application No. 12/717,234, filed on Mar. 4, 2010, now Pat. No. 8,424,099.

(56) References Cited

U.S. PATENT DOCUMENTS

| | | | |
|---|---|---|---|
| 2003/0226029 A1* | 12/2003 | Porter | G06F 21/10 726/26 |
| 2004/0085446 A1 | 5/2004 | Park | |
| 2004/0252965 A1* | 12/2004 | Moreno | H04N 5/781 386/231 |
| 2005/0172134 A1 | 8/2005 | Thornton et al. | |
| 2005/0188224 A1* | 8/2005 | Betts-LaCroix | G06F 21/34 726/5 |
| 2005/0278787 A1* | 12/2005 | Naslund | G06F 21/10 726/26 |
| 2007/0132836 A1* | 6/2007 | Katz | G06Q 20/208 348/14.01 |
| 2007/0160151 A1 | 7/2007 | Bolton et al. | |
| 2008/0072333 A1 | 3/2008 | Chen | |
| 2008/0137848 A1 | 6/2008 | Kocher et al. | |
| 2008/0316357 A1 | 12/2008 | Achari et al. | |
| 2009/0066788 A1* | 3/2009 | Baum | G06F 17/30017 348/143 |
| 2009/0144541 A1 | 6/2009 | Kim et al. | |
| 2009/0245520 A1 | 10/2009 | Chang et al. | |
| 2009/0307749 A1 | 12/2009 | Lee et al. | |
| 2010/0060787 A1* | 3/2010 | Watanabe | H04N 5/4401 348/553 |
| 2010/0186087 A1 | 7/2010 | Bolton et al. | |
| 2011/0063528 A1* | 3/2011 | Yang | G06F 1/1639 348/789 |
| 2011/0173655 A1* | 7/2011 | Blumenschein | H04N 21/234 725/35 |

OTHER PUBLICATIONS

EP search Report in corresponding EP 11156469 dated Feb. 10, 2012.
Open Cable Specification, CableCARD Copy Protection 2.0 Specification, OC-SP-CCCP2.0-104-060803, Aug. 3.
Open Cable Specifications, Multi-Stream CableCARD Inerface, OC-SP-MC-IF-CO1-050331, Mar. 31, 2005.
Elkouny et al. "Secure Scalable Video Transcoding Over Wireless Netwrok", Intelligent Computer Communication and Processing, 2007 IEEE International Conference on Date of Conference: Sep. 6-8, 2007, pp. 287-292.
European Office Action—EP 11156469.6—dated Jun. 4, 2015.
Response to Foreign Office Action—EP Appl. 11156469.6—submitted Oct. 5, 2015.
Dec. 18, 2017—Canadian Office Action—CA 2,732,709.

* cited by examiner

PC SECURE VIDEO PATH

FIELD OF ART

This application is a continuation of prior U.S. Ser. No. 14/201,997, filed Mar. 10, 2014, entitled "PC Secure Video Path", which is a continuation of prior U.S. Ser. No. 13/769,618, filed on Feb. 18, 2013, and entitled "PC Secure Video Path", now U.S. Pat. No. 8,713,685, which is a continuation of prior U.S. Ser. No. 12/717,234, filed on Mar. 4, 2010, and entitled "PC Secure Video Path", now U.S. Pat. No. 8,424,099, the disclosures of which are hereby incorporated by reference.

BACKGROUND

Hollywood's film industry relies on a staged approach to theatrical releases. A new movie is usually first released only to movie theaters. Marketing efforts and popular opinion of a film is often at its peak surrounding the film's initial release, and film studios look to recoup as much of their investment as possible through ticket sales at the movie theater box offices. A film cannot remain at the box office forever, though, and it is eventually pulled from theaters to be released for sale or rental on a physical medium (e.g., a Digital Video Disk—DVD, Blu-Ray, etc.), or as a pay-per-view option in a restricted environment, such as a cable television system, satellite system, hotel system, or the like.

After the film has had its run in that sales and pay-per-view stage, it may then be released to pay cable channels, such as HBO, SHOWTIME, CINEMAX, etc. After the cable channels have had their run with the film, the film may then be released to an over-the-air television network, such as ABC, CBS, NBC, etc., and may be made available for personal computer download at websites associated with those television networks, or on other Internet sites.

This staged, controlled, release is performed in order to maximize revenue. Since movie piracy is the principal threat to that revenue, it is not surprising that these stages begin with the most restrictive and difficult to pirate (movie theaters), and end with the least restrictive and easiest to pirate (over-the-air broadcasts and Internet downloads).

Notably for the present discussion, the Internet download option tends to be offered only towards the tail end of the movie's staged release, sometimes over a year after the movie's theatrical release. This late timing is due to the inherent insecurity of a personal computer (PC) platform. A wide array of PC software tools (hacking programs, debuggers, etc.) allows pirates to access an Internet movie download, break whatever copy protection is included with the movie, and copy it, so studios are loathe to release a movie for Internet download too early in the release cycle.

However, since many of us spend more time with our computers than our televisions, and since the marketing and popularity of a film is often higher at the earlier stages in the release cycle, studio revenues could be increased if new movies could be securely released to a wider audience in the earlier stages of a release.

SUMMARY

This summary is not intended to identify critical or essential features of the inventions claimed herein, but instead merely summarizes certain features and variations thereof A secure video content method may include detecting the insertion of a portable security module, or electronic key safe, on a personal computer coupled to an external network, using the portable security module to create a secure video content path within the personal computer, receiving secured and unsecured content at the personal computer from the external network, routing the secured content to the secure video content path, and routing the unsecured content to a video content path in the personal computer different from the secure video content path.

In some embodiments, the portable security module may be bound to a secure processor in the personal computer, and may receive a new encryption key in response to the binding. When secure content is requested, the portable security module may supply different encryption keys to the secure content processor, enabling the decryption and viewing of secured content on the personal computer. Those keys may be passed via a secure encrypted tunnel between the portable security module and the on-board secure content processor in the personal computer, which may make it difficult for a hacker to obtain the key.

The personal computer for such a system may include a security module interface, configured to connect to an external security module, a secure video processor, configured to process secured video content for display, and a processor, configured to receive a content key from the external security module via the security module interface, and supply the content key to the secure video processor, wherein the secure video processor is configured to decrypt secure video content received from an external network using the content key.

The personal computer may also include a local wireless network interface circuit, coupled to the processor, and configured to access a local wireless network, a universal serial bus (USB) interface for the security module, and an unsecured video processor, configured to process unsecured video content for display, wherein the processor is configured to forward unsecured video content to the unsecured video processor for processing and display, and divert secured video content to the secure video processor for processing and display.

In some embodiments, the personal computer's processor may be further configured to automatically transmit, to an external network, a binding request containing identification information for the security module and the secure video processor.

The portable security module may contain an interface configured to attach to a personal computer interface, and a processor, configured to identify a secure video processor of a personal computer after the portable security module is attached to the personal computer, determine a content key needed by the secure video processor to decrypt secure content, and transmit the content key to the secure video processor in response to a user request to access the secure content.

The portable security module may be further configured to establish an encryption key with the secure video processor of the personal computer, and to use the encryption key when transmitting the content key to the secure video processor.

The various features described above may be implemented using a personal computer or processing device, which may operate by executing computer-executable instructions for performing the various features described. Accordingly, some embodiments herein include the computer-readable media storing those instructions.

Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
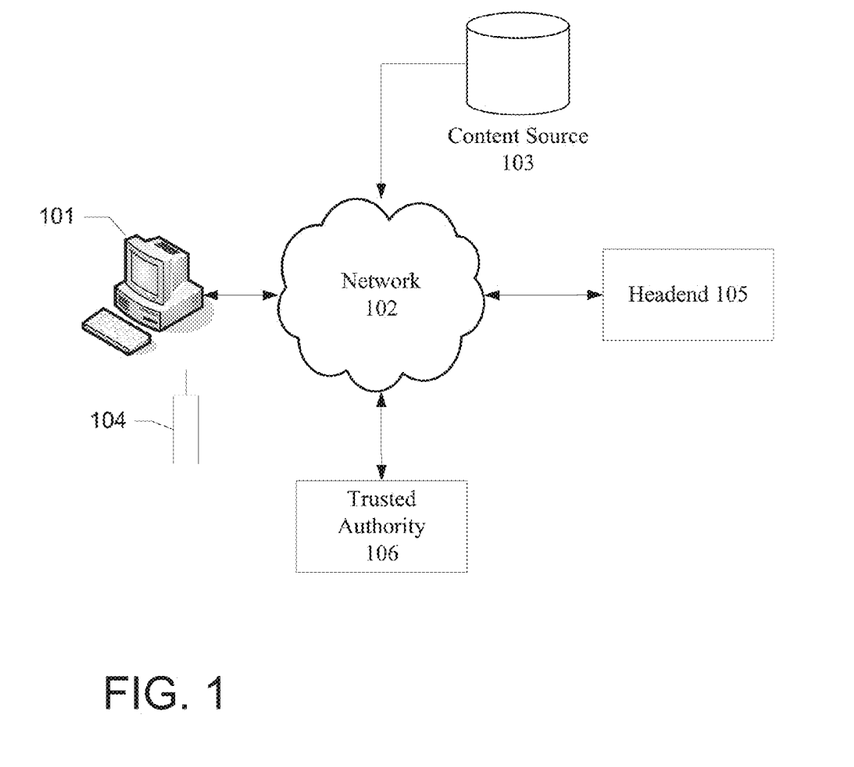
FIG. 1 illustrates an example system on which features described herein may be implemented.

FIG. 1 illustrates, in one aspect described herein, basic components of a system on which features described herein may be implemented. The system may generally allow a user of the PC 101 to access various content from the network 102, such as any Internet content, video content (movies, television shows, music, etc.). The features herein, however, may also allow the user of the PC 101 to establish a parallel secure video path within the PC 101 for the reception and viewing of certain types of secured content. The secured content may be the same as unsecured content (e.g., movies, television shows, music, etc.), but with additional security features as described herein. Other types of content, such as computer-executable programs, data files, electronic books, still images, audio files, etc., may be securely accessed as well.

The PC 101 may be any type of personal computer, such as a desktop computer or laptop computer. The PC 101 may initially be considered unsecured from the point of view of the content source 103 (as contrasted with, for example, secured devices such as a dedicated cable television set-top box, satellite decoder box, hotel set-top-box, etc.). Unsecured devices may be devices that are not initially provided by the content source 103, or entities having the authority of the content source 103 to distribute content. Other types of unsecured computing devices, such as cell phones, personal data assistants (PDAs), etc. may also benefit from the features herein.

The PC 101 may be connected to a communication network 102, and may ultimately receive the secured content from content source 103 over the network 102. Network 102 may be any type of information communication network, such as the Internet. The physical structures of the network 102 may be of any type, such as coaxial cable network, fiber optic cable network, hybrid fiber (coax and fiber) cable network, telephone (land or cellular) network, satellite network, etc.

Content source 103 may be any type of computing device that is configured to supply secured content, such as secured video content, over the network 102. Source 103 may be, for example, a movie studio's download server, which may be configured to offer secure movie downloads to customers who wish to view a movie during an early release cycle stage (e.g., while the movie is in theaters, or when the movie has been released for rental). As another example, the content source 103 may be a server at a local cable television head-end, supplying video content to cable subscribers, or any online video content supplier (e.g., an Internet supplier). The physical layout of the source 103 may take any desired form, such as a computing platform having components similar to those found in PC 101 (discussed in greater detail below).

To create the secure video path for the PC 101, the user may first insert a portable security module or electronic key safe 104 into the unsecure PC 101. Security module 104 may be a Universal Serial Bus (USB) dongle, such as a keychain dongle or "thumb" drive, that can be inserted into the PC 101 to establish the secure video path within the PC 101. The security module 104 may then communicate, via PC 101 and network 102, with various external entities to obtain authorization for accessing secured content, and to establish a secure video path within the PC 101. Those external entities may include, for example, one or more sources of content 103, a cable television (or network) headend 105, a trusted authority 106, and any other desired type of networked computing device. The headend 105 may include any additional desired components. For example, a headend 105 may include a computing device serving as an authentication proxy to assist in authenticating clients that sign onto the network. The trusted authority 106 may be an entity that is trusted by the content source 103, the maker of the PC 101, and the maker of the security module 104 to maintain and use secret encryption keys and digital signature keys for the source 103, PC 101 and security module 104.

Figure 2:
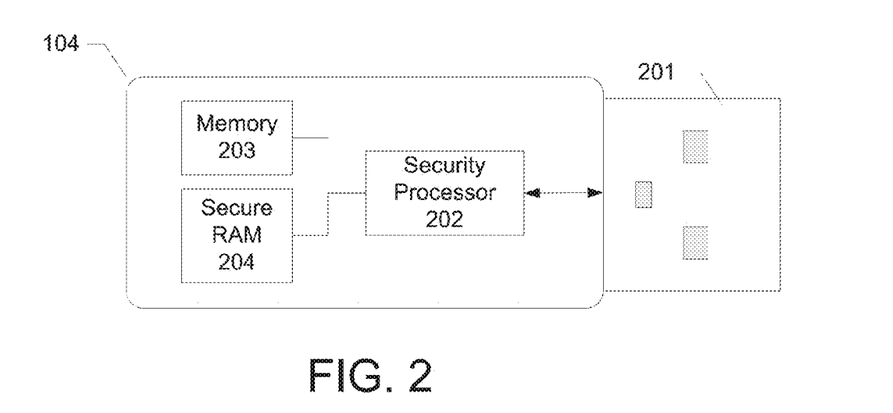
FIG. 2 illustrates a portable security module, or electronic key safe.

FIG. 2 illustrates an example configuration for the security module 104. As noted above, the security module 104 may be a portable device having an interface 201 that allows it to be coupled to an unsecure PC 101. The interface 201 may be, for example, a Universal Serial Bus (USB) format interface, although other interface formats may be used as well. For example, formats such as ISO-7816 (Smart Card), IEEE-1394 (Fire Wire), PCI, PCI Express and Ethernet, may alternatively be used.

The security module 104 may include a security processor 202, which may be a microprocessor or programmable logic circuit configured to execute instructions stored on a memory 203 to perform features described herein. Memory 203 may be any desired type of memory, such as a FLASH memory. The module 104 may include a secure portion 204 of memory. Access to the secure portion 204 of memory may be restricted to avoid compromise through hacking. The type of restriction may include a password-restricted access, such that a predetermined password must be used to access contents of the memory. Additionally, the secure portion 204 of memory may have its contents encrypted using any desired encryption algorithm. Any necessary password and decryption key may be coded into the security processor 202's operating code, a portion of which may be embedded within the processor 202 itself.

During manufacture, or at any point prior to distribution to the public, the security module 104 may undergo a security procedure keying operation. During that procedure, the security module 104 may be assigned a globally unique identification value, and one or more keys for encryption and/or secure signing, and this data may be stored in the memory 203, 204 of the module. The identification value may be, for example, a media access control (MAC) address, and may be stored in the common area of memory 203. The keys may be stored in the secure memory 204, and may be established for any desired type of encryption, such as RSA (Rivest-Shamir-Adleman), DES (Data Encryption Standard), AES (Advanced Encryption Standard), Triple-DES, etc. The trusted authority 106 may separately retain a database in a memory (e.g., similar to the hard drive 303 or other memory components of PC 101) correlating the various security module 104 identities and their corresponding keys.

For increased security, the trusted authority's database may omit storing the private keys for modules that use asymmetric encryption algorithms and have public/private key pairs, such as RSA. In those situations, the trusted authority 106 might only store the public keys for the modules, correlated to the various modules' identities.

Figure 3:
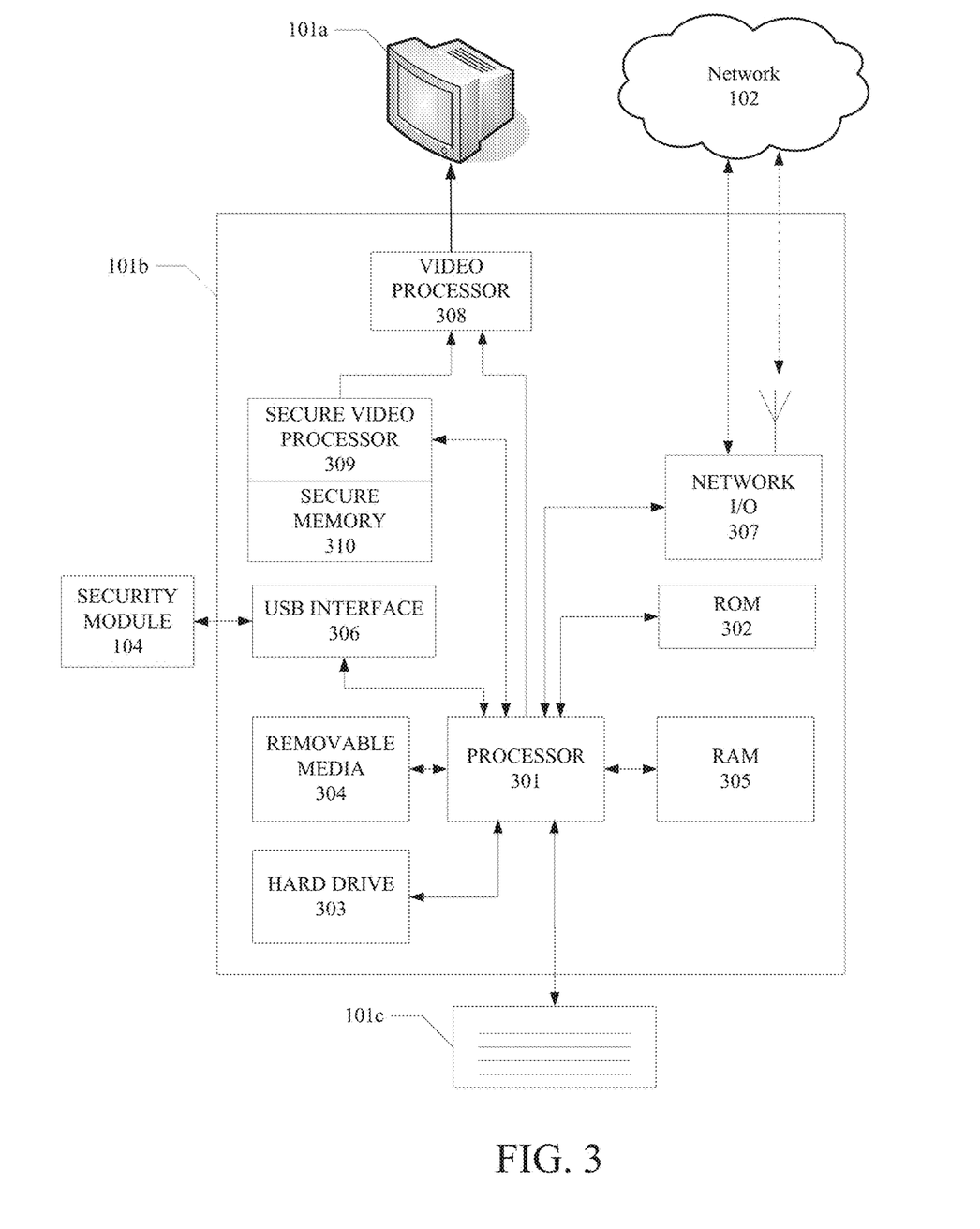
FIG. 3 illustrates additional details of the PC included in the example system of FIG. 1, and of general PCs on which various components described herein may be implemented.

FIG. 3 illustrates example components of the system shown in FIG. 1. The unsecure PC 101 may include a display 101a, a housing 101b for various internal components (which may be part of the display 101a, if desired), and various user input devices 101c, such as a keyboard, mouse, touch screen or touch pad input, etc. Additional output devices, such as an audio output device (such as speakers, headphones, etc.—not illustrated) may also be included.

Of course, this example is merely an example, and other configurations (e.g., having more or fewer components, duplicate/combined components, etc.) may be used for PC 101. Additionally, the configuration shown in FIG. 3 may also be used to implement any of the other components described herein, with computer-executable instructions stored on memory (e.g., hard drive 303, RAM 305, etc.) that, when executed by a processor (e.g., processor 301), cause the component to perform as described herein.

The PC 101 may include one or more processors 301, which (like security processor 202) may be a microprocessor of programmable logic circuit configured to execute instructions to perform the various features described herein. Those instructions may be stored, for example, on an internal read-only memory (ROM), which may contain the built-in operating system (BIOS) for the PC 101. The instructions may also be stored in other areas of memory as well, such as a hard drive 303, removable media 304 (e.g., floppy disk, FLASH drive, CD-ROM, DVD-ROM, etc.), or even in random-access memory (RAM) 305.

The PC 101 may include an interface 306 that is configured to communicate with the interface 201 on security module 104. For example, the interface 306 may be a USB port. The PC 101 may also include a network interface circuit 307, which the PC 101 may use to communicate with any desired external network. The network interface circuit 307 may include a local wireless network interface, such as for a WiMAX network, BLUETOOTH network, an ANSI 802.11x network, or any other local wireless network, and may include one or more wireless antennas. The interface circuit 307 may also support longer-range wireless networking, such as cellular telephone wireless networks, satellite, etc. The interface 307 need not be limited to wireless networks, and may alternatively include support for wired networks as well, such as Ethernet, cable television, etc.

The PC 101 may also include a video processor 308, which may be any desired type of processor or circuit that supplies the display 101a with images to show a user. For example, a video processor 308 may be a video graphics card. The video processor 308 may include any desired type of hardware and/or software configuration to receive, decode and display video data received from the network 102 (which may be processed by other devices, such as network input/output 307 and/or a processor 301 first.

The PC 101 may also include a secure video processor 309. The secure video processor 309 may include additional hardware and/or software to handle the reception, decrypting, decoding and/or display of video data that has been secured in a desired manner. For example, some incoming streams of video data (e.g., a stream of a new release movie) may be encrypted, and the secure video processor may be configured to handle the decryption of that incoming stream. In some embodiments, the security module 104 may create a secure communication link (e.g., a tunnel) with the secure video processor 309, and may use that link to supply the secure video processor 309 with the necessary key(s) (e.g., a content key) to decrypt an incoming stream. That incoming stream may be decrypted within the secure video processor 309, and the resulting decrypted stream may be supplied to the video processor 308 for output on the display 101a. Additional discussion of how such secured content may be processed within the PC 101 appears further below.

The secure video processor 309 may be a separate component from the video processor 308. For example, the video processor 309 may be a plug-in module that attaches to an expansion slot (e.g., a PCI—Peripheral Component Interconnect—expansion slot) on a PC 101 motherboard, or attaches directly to the video processor 308 itself. Alternatively, the secure video processor 308 may be formed as a sub-component of the video processor 308 itself.

Like the security module 104, the secure video processor 309 may also undergo a security procedure keying operation during manufacture, and may be assigned a unique identification value and one or more private keys for signing and/or encryption. Those keys may be stored in a secure memory 310, which may be an internal component of the secure video processor 309 (or its circuitry).

During operation, the processor 301 may be programmed to receive incoming communications, and to divert all communications containing secured content to the secure video processor 309 for handling. That secure content may be identified by, for example, a predetermined header value indicating secure treatment. Unsecured video content may be forwarded to the video processor 308 for handling, and the PC 101 may switch between the two video processors depending on the content chosen for viewing.

Figure 4:
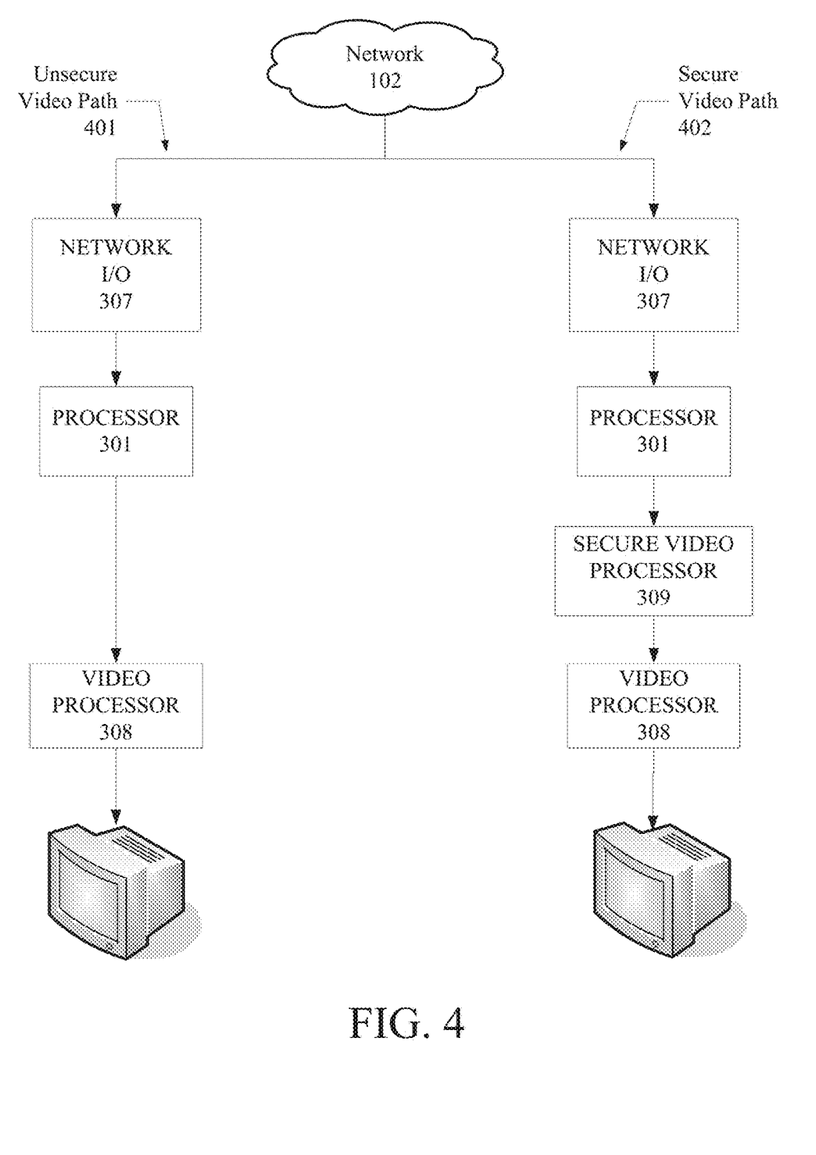
FIG. 4 illustrates an example set of parallel content paths within the PC shown in FIG. 1.

FIG. 4 is a logical diagram illustrating an example set of parallel content paths (video as the example) through PC 101, where data for unsecured content may pass through path 401, and data for secured content may pass through secure video path 401. In both paths, the content may be received from network 102 at the network interface 307, although they may be received as separate logical streams carried over the same physical interface (e.g., MPEG2, IPTV streams, MPEG4, fragmented MPEG4, progressive download, etc., streams carried over a coaxial or fiber optic cable). The content may be processed by a processor 301 for receipt. The unsecured content data, which may be a cleartext (e.g., unencrypted) video stream, may be forwarded directly to the video processor 308 for decoding and display. The secured content, however, may be in encrypted form, and may be passed to secure video processor 309. The secure video processor 309 may confirm that the secure stream is authorized for viewing by the user (e.g., the secure stream may identify the secure video processor 309 as being authorized, or may be encrypted using a key that can only be decrypted by the secure video processor 309), and the secure video processor 309 may then decrypt the stream and assemble a cleartext video stream to supply to the video processor 308 to decode and send to display 101a.

Figure 5:
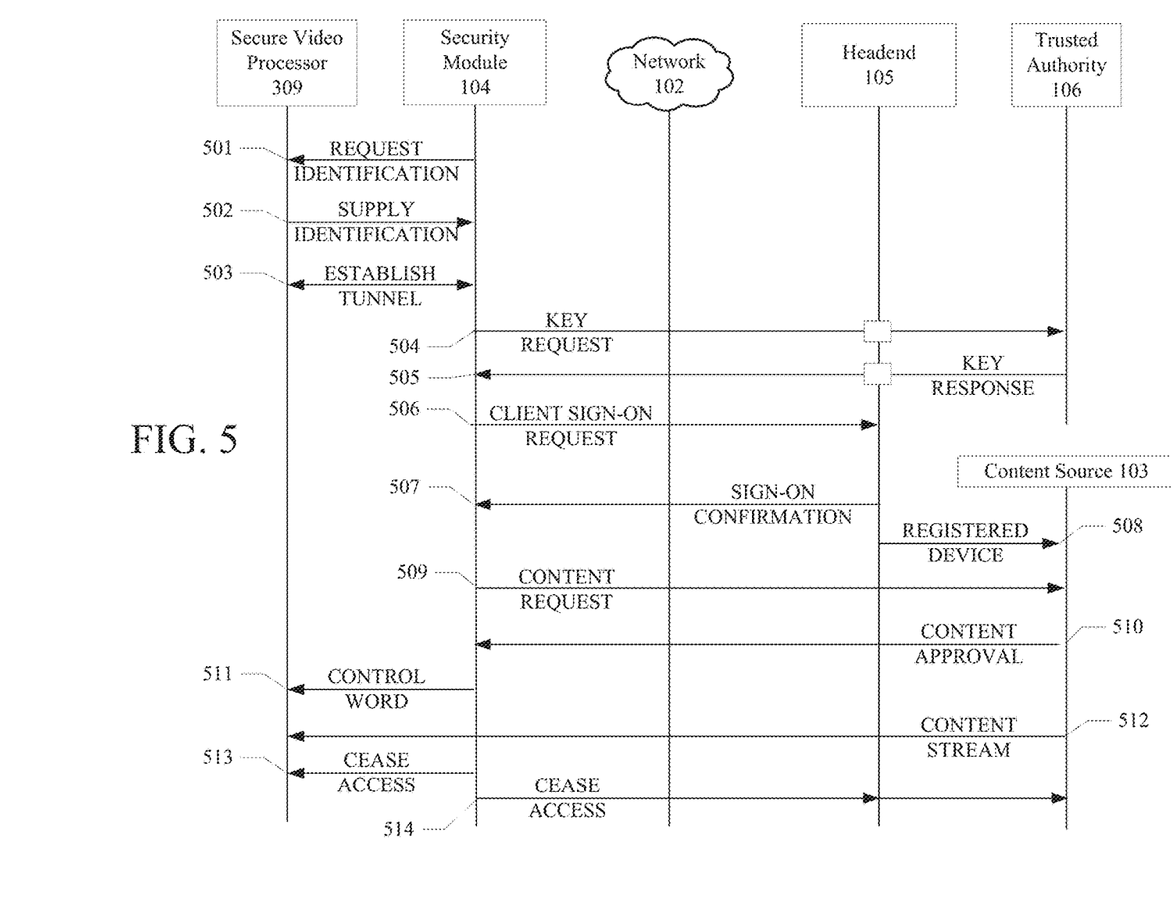
FIG. 5 illustrates communication signaling steps for establishing a secure PC video path in one example embodiment described herein.

FIG. 5 illustrates example communication signals used to establish a secure PC video path, and the sequence of these signals may be viewed as a process occurring after the user has inserted a new security module 104 into the PC 101. In step 501, the security module may send a request to the secure video processor 309 to obtain the unique identification for the processor 309. In step 502, the processor 309 may respond with that information, and in step 503, the security module 104 and secure video processor 309 may establish a secure tunnel between the two for communication. That secure tunnel may involve, for example, the two of them using their own respective private keys to establish a secure session key used for communications between the two.

In step 504, the security module 104 may transmit a key request message to authenticate itself to the trusted authority 106. The key request message 504 may include identification of the authentication proxy (e.g., in headend 105), identification of the security module 104, and identification of the secure video processor 309, and may inform the trusted authority 106 that this particular security module 104 will be using the identified proxy and processor. To demonstrate its authenticity, the security module 104 may include in the key request a hashed value of the security module 104's private key. The message (or portions thereof) may be encrypted by the security module 104 using a private encryption key, so that intermediaries (such as the authentication proxy in headend 105) may be deterred from accessing the message contents. In FIG. 5, the box at the headend 105 represents such a proxying of the communication, where the headend 105 merely passes along at least a portion of the key request message (without decrypting or accessing that portion). A similar proxying may be conducted for the response, discussed below.

Upon receiving the key request message, the trusted authority 106 may consult its own stored database to determine the private key(s) that are supposed to correspond to the identified security module 104 (as noted above, that database may be populated at the time the security module 104 is manufactured). The trusted authority 106 can perform the same hash on the private key(s), and compare the results with the hashed value in the key request message. If the hashed values match, then the trusted authority 106 can conclude that the key request message truly originated from the security module 104. Of course, if portions of the key request message were encrypted by the security module 104, then the trusted authority 106 may use the private key(s) from its database to decrypt the message contents, and a successful decryption would also demonstrate that the key request message was authentic.

If the security module's identity corresponds to the hashed private key, the key request message is authenticated, and the trusted authority may store information correlating the security module 104 with the proxy 105 and secure video processor 309 identified in the message. The trusted authority may then transmit a key response message 505 to the security module 104, containing authentication proxy (in headend 105) private keys that can be used to securely communicate with the proxy 105. Those private keys may include, for example, encryption and/or signing keys used by the authentication proxy. Although message 505 is illustrated with a block for the proxy, a portion of the message 505 (or a separate message) may be directed to the authentication proxy, informing it of the private keys that will be used by the security module 104.

When the security module 104 contains the authentication proxy private keys, it is ready to begin secure communications with the proxy. To begin, the security module 104 may transmit a client sign-on request 506 to inform the proxy that it has been authenticated by the trusted authority, and to identify capabilities of the security module 104. The sign-on request may include session key and/or identification information for communicating with the proxy and information identifying the software client(s) and/or hardware capabilities of the security module 104, and may be signed by the security module 104's signing key and encrypted using the authentication proxy's encryption key. The sign-on request 506 may also include a hashed version of the security module 104's own signing and/or encryption keys, to assist in demonstrating to the proxy that the request is authentic.

The authentication proxy (e.g., in headend 105) may receive the sign-on request, and then validate the request by checking to confirm that the request was properly encrypted using the authentication proxy's encryption key, signed using the security module 104's signing key, and containing the correct hashed version of the security module 104 signing and/or encryption keys. Then, the proxy may record information identifying the client capabilities of the security module 104, and may record session information (session keys, session ID values, etc.) to establish the secure session with the security module 104.

The proxy may then transmit a sign-on confirmation message 507 back to the security module 104, informing it that the sign-on was successful. The message may include instructions telling the security module 104 to download one or more software applications that are necessary or desirable for operating with the proxy's network. Those applications may be transmitted with the confirmation message, or they may be transmitted separately (e.g., on a periodic basis to all serviced PCs).

The proxy may also transmit a registered device message 508 to the content source 103, informing it of the authenticated security module 104, and providing the module 104's identification and public key information.

When the user of PC 101 wishes to access secured content, the user may indicate such a request to PC 101. This may be accomplished, for example, by the user navigating to an Internet site of content source 103, and selecting a piece of secured content for access. As noted above, the secured content may be any amount and type of data, including audio/video programming (e.g., television shows, movies, music, audio files), software (e.g., computer programs), or other types of data. When the PC 101 receives such a request, it may transfer a content request message 509 to the content source 103. That request may identify the security module 104, and may also identify the user him/her self, as well as the requested content. The request may be encrypted by the security module 104's encryption key, signed by its signing key, or both, and the content source 103 will be able to use the key information previously received from the authentication proxy in the registered device message 508 to verify that the user's request is genuine. The content source 103 may determine whether the requested access is to be permitted (based on whether the user has sufficiently paid for the content, or is subscribed to the content source 103, or has sufficient funds in an account at the source 103 to pay for the download, etc.).

If the content request is to be approved, then the content source 103 may transmit a content approval message 510 to the security module. That message 510 may contain a key (e.g., a control word) needed for decrypting the requested content, and may be encrypted using the security module 104's own public encryption key. Alternatively, the message may be encrypted and/or signed using the AP keys. The message 510 may also include usage rules governing the permitted usage of the requested content. The usage rules may specify a permitted (or restricted) display resolution, a time period for access, number of simultaneous or sequential accesses, etc.

In response, the security module 104 may transmit a control word message 511 to the secure video processor 309, informing the secure video processor 309 of the control word to be used for the requested content, and of the terms of access. That message 511 may be encrypted using the secure video processor 309's own public encryption key, or whatever key protocols were used to establish the tunnel in 503. The secure video processor 309 may store that control word in secure memory 310.

Then, the content source 103 may begin transmitting the stream of encrypted content packets 512 to the PC 101. The stream 512 may contain multiple packets of information, and may include one or more header packets having a predetermined value or code that identifies the stream as being an encrypted content authorized by the security module 104, and the PC's processor 301 may route the incoming packets of that stream to the secure video processor 309 for handling, instead of to the normal (unsecure) video processor 308. Since the stream 512 is encrypted for use with the control word, which was supplied in encrypted form to the security module 104, the processor 301 lacks the ability to decrypt the stream on its own, and any hacker using monitoring software on the processor 301 to read the stream would only receive the encrypted version of the stream 512 data. The secure video processor 309 possess the control word (via a secure tunnel from the security module 104), and is able to decrypt and display the secured content, but since the control word is sent over the secure tunnel with the security module 104, a hacker will encounter difficulty determining that control word. Accordingly, a secure video path may be established within the PC 101, in which secure video (or other) content may be passed from the network interface 307, to the processor 301, to the secure video processor 309, and out to the video processor 308 and display 101*a*, and the path may be secured using a key that was securely provided to the portable security module 104, so that video security may be added to an unsecured PC 101 simply with the addition of the module 104.

When the user no longer wishes to access the secured content, the user may enter an input to the PC 101 (e.g., by clicking on an Internet page element, pressing a button on the keyboard, etc.), and the PC 101 may inform the security module 104 that access is to be ceased. In response, the security module 104 may transmit a cease access message 513 informing the secure video processor 309 to terminate the decryption process. A cease access message 514 may also be passed on to the authentication proxy 105, which may inform the content source 103 to terminate the transmission of the secure content.

Although one example embodiment is described above, other alternate embodiments and modifications may be used. For example, and as noted above, the network interface 307 may be a wireless interface. The entire PC 101 may be a laptop computer using such a wireless interface (e.g., ANSI 802.11), such that a user can convert their laptop computer into a secure device for accessing video content from, for example, their cable company via a secure Internet download. The use of the security module 104, with the authentication proxy 105 and the secure path within the laptop PC 101, assuages the content provider's concerns that the delivered content will be "hacked" or otherwise made available in unencrypted form, and the simple USB form factor of the security module 104 makes it easy to use.

As one modification, different parts of the secured content may be secured using different control words. For example, the audio and video portions of a movie may be encrypted by the content provider 103 with different control words, and supplied as separate streams. To support such an embodiment, the secure video processor 309 (which may also handle non-video signals, such as audio) may be configured to support multiple streams 512 and control words simultaneously.

Additionally, the various elements described above may be subdivided and/or combined in any desired manner, and some elements may be omitted. Also, although FIG. 3 illustrates internal components of an example PC 101, similar components may be used to implement any of the other elements described herein (e.g., the headend 105, the authentication proxy, the trusted authority 106, the content source 103, etc.), and all of these components may include a processor (such as processor 301) configured to operate in the manner described. That configuration may be accomplished using computer-executable instructions, executed by the processor, and those instructions may be stored on a computer-readable medium, such as any of the memory elements shown in FIG. 3 or discussed above.

In some embodiments, the security module's secure memory 310 may be volatile, and may be configured to reset to a blank state each time the security module 104 is removed from the PC 101 or otherwise reset. In this manner, the user can use the portable security module 104 with different PC 101's around the user's home (although a new binding process may occur when the device is placed on a new PC).

The above description and drawings are illustrative only. The features herein are not limited to the illustrated embodiments, and all embodiments of the invention need not necessarily achieve all of the advantages or purposes, or possess all characteristics, identified herein. Additionally, the various components described above may be combined, or divided, in any desired manner. For example, various components may be combined into a single unit. As another example, the features of the trusted authority 106 may be distributed to other elements in the system, such as the previously-mentioned authentication proxy. As another example, the portable security module 104 may be integrated with the other components of the PC, such as the secure video processor 309.

In some embodiments, the PC's secure video processor 309 may include a built-in security module that operates in the same manner as security module 104. Inserting the portable security module 104 may, in those embodiments, disable the built-in security module in the processor 309, and the PC may operate using the security module 104 instead of the one that was on board in the original processor 309. In this manner, security may be renewed if the original security module is compromised.

As another modification, the security can be built-into the security module 104. The FIG. 5 example illustrates a downloadable security process, in which the client issues a sign-on request (506) and receives a confirmation 507 that may require the module to download additional security applications for configuration (e.g., software defining personality characteristics of the module). That example is a downloadable security example. The modification here can skip that download of additional security configuration applications. relying instead on the security module 104 having the security configuration code already stored therein. In such an alternative embodiment, the client sign-on request 506 and confirmation 507 can simply involve the client logging on to the network, and runtime download can be minimized. the key request/response 504/505 can also take place after the authentication (instead of before the sign-on, as illustrated in FIG. 5). The sign-on and confirmation can simply be an authentication process to verify the client's identity using any desired type of challenge/response system. For example, the sign-on can involve the requesting client signing a piece of data to satisfy a challenge and prove its identity. The headend 105 can also issue a challenge/response to the client as well.

The invention claimed is:

1. A method comprising:
   establishing, by a computing device connected with a security module, a secure tunnel between the computing device and the security module;
   receiving, by the computing device, a user selection of a content item;
   after determining that the content item is secured, sending, by the computing device:
      a request for the content item,
      an identifier of the computing device, and
      an identifier of the security module;
   receiving, by the computing device, from the security module, and via the secure tunnel, one or more control words;
   receiving, by the computing device, an encrypted stream comprising the content item;
   decrypting, by the computing device and using the one or more control words, the encrypted stream comprising the content item;
   prior to the decrypting the encrypted stream, routing, by the computing device, the encrypted stream to a secure video processor of the computing device;
   after the decrypting the encrypted stream, routing, by the computing device, an unencrypted version of the encrypted stream from the secure video processor to an unsecure video processor of the computing device; and
   causing, by the unsecure video processor, display of the content item.

2. The method of claim 1, wherein the establishing the secure tunnel is after establishing the connection between the computing device and the security module.

3. The method of claim 1, further comprising:
   sending, by the computing device and to a trusted authority computing device, a key request message comprising:
      the identifier of the security module, and
      an identifier of an authentication proxy computing device.

4. The method of claim 3, further comprising:
   after the sending the key request message, receiving, by the computing device and from the trusted authority computing device, a key response message comprising one or more private keys of the authentication proxy computing device.

5. The method of claim 1, further comprising:
   decrypting, by the computing device and using a first control word of the one or more control words, an audio portion of the encrypted stream; and
   decrypting, by the computing device and using a second control word of the one or more control words, a video portion of the encrypted stream, wherein the first control word is different from the second control word.

6. The method of claim 1, further comprising:
   after establishing the connection between the computing device and the security module, disabling, by the computing device, a different security module connected to the computing device.

7. A method comprising:
   establishing, by a computing device connected with a security module, a secure tunnel between the computing device and the security module;
   sending, by the computing device:
      a request for a content item,
      an identifier of the computing device, and
      an identifier of the security module;
   receiving, by the computing device, from the security module, and via the secure tunnel, a first control word and a second control word different from the first control word;
   receiving, by the computing device, an encrypted stream comprising the content item;
   decrypting, by the computing device and using the first control word, an audio portion of the encrypted stream;
   decrypting, by the computing device and using the second control word, a video portion of the encrypted stream;
   prior to decrypting the audio portion and the video portion of the encrypted stream, routing, by the computing device, the encrypted stream to a secure video processor of the computing device;
   after decrypting the audio portion and the video portion of the encrypted stream, routing, by the computing device, an unencrypted version of the encrypted stream from the secure video processor to an unsecure video processor of the computing device; and
   causing, by the unsecure video processor, display of the content item.

8. The method of claim 7, wherein the establishing the secure tunnel is after establishing the connection between the computing device and the security module.

9. The method of claim 7, further comprising:
   sending, by the computing device and to a trusted authority computing device, a key request message comprising:
      the identifier of the security module, and
      an identification of an authentication proxy computing device.

10. The method of claim 9, further comprising:
    after the sending the key request message, receiving, by the computing device and from the trusted authority computing device, a key response message comprising one or more private keys of the authentication proxy computing device.

11. The method of claim 7, further comprising:
    after establishing the connection between the computing device and the security module, disabling, by the computing device, a different security module connected to the computing device.

12. The method of claim 1, further comprising:
    after the sending, receiving, by the security module and from a content source, the one or more control words.

13. The method of claim 1, wherein the secure tunnel is based on a private key of the security module or a private key of the secure video processor.

14. The method of claim 3, wherein the key request message is encrypted using a private key of the security module.

15. The method of claim 4, further comprising:
    encrypting, by the computing device and using the one or more private keys of the authentication proxy computing device, a client sign-on request; and sending, by the computing device and to the authentication proxy computing device, the encrypted client sign-on request.

16. The method of claim 15, further comprising:
after the sending the encrypted client sign-on request, receiving, from the authentication proxy computing device, a sign-on confirmation message.

17. The method of claim 7, further comprising:
after the sending, receiving, by the security module and from a content source, the first control word and the second control word.

18. The method of claim 9, wherein the key request message is encrypted using a private key of the security module.

19. The method of claim 10, further comprising:
encrypting, by the computing device and using the one or more private keys of the authentication proxy computing device, a client sign-on request; and
sending, by the computing device and to the authentication proxy computing device, the encrypted client sign-on request.

20. The method of claim 19, further comprising:
after the sending the encrypted client sign-on request, receiving, from the authentication proxy computing device, a sign-on confirmation message.

* * * * *

UNITED STATES PATENT AND TRADEMARK OFFICE
CERTIFICATE OF CORRECTION

PATENT NO. : 10,055,553 B2
APPLICATION NO. : 15/084203
DATED : August 21, 2018
INVENTOR(S) : James W. Fahrny Page 1 of 1

It is certified that error appears in the above-identified patent and that said Letters Patent is hereby corrected as shown below:

On the Title Page

Page 2, Column 2, item [56], Other Publications, Line 5:
Delete "Inerface," and insert --Interface,--

Page 2, Column 2, item [56], Other Publications, Line 8:
Delete "Netwrok"," and insert --Network",--

In the Specification

Column 1, Summary, Line 65:
After "thereof", insert --.--

Column 6, Detailed Description, Line 18:
After "For example, the", insert --secure--

Column 6, Detailed Description, Line 23:
Delete "308" and insert --309--

Column 10, Detailed Description, Line 64:
Delete "applications. relying" and insert --applications, relying--

Column 11, Detailed Description, Line 2:
Delete "minimized. the" and insert --minimized. The--

Signed and Sealed this
Twenty-sixth Day of February, 2019

Andrei Iancu
*Director of the United States Patent and Trademark Office*